NOISE SUPPRESSION AND LIMITER CIRCUITS

Filed June 30, 1953 2 Sheets-Sheet 1

INVENTOR.
Kenneth E. Doriot.
BY W. L. Stout
HIS ATTORNEY

NOISE SUPPRESSION AND LIMITER CIRCUITS

Filed June 30, 1953 2 Sheets-Sheet 2

INVENTOR.
Kenneth E. Doriot.
BY
W. L. Stout.
HIS ATTORNEY

United States Patent Office 2,800,582

Patented July 23, 1957

2,800,582

NOISE SUPPRESSION AND LIMITER CIRCUITS

Kenneth E. Doriot, Verona, Pa., assignor to Westinghouse Air Brake Company, Wilmerding, Pa., a corporation of Pennsylvania Application June 30, 1953, Serial No. 365,201

3 Claims. (Cl. 250—20)

My invention relates to improvements in noise suppression circuits for use in communications apparatus, and more particularly to improvements in squelch and limiter circuits for use in frequency modulation receivers.

Some prior art devices employ a noise amplifier stage to amplify the noise which is present in the plate circuit of a conventional limiter stage. The output of the noise amplifier stage is rectified to obtain a negative direct current voltage which is applied to the control grid of an audio control tube so as to bias this tube beyond cutoff. While the audio control tube is biased beyond cutoff, the audio which originates in the discriminator is not allowed to pass through the inoperative audio control stage to the following audio amplifier stage, and therefore there is no output from the audio amplifier and transducer. While a carrier signal of the prescribed frequency and amplitude is received, the noise which was present in the limiter plate circuit is reduced to a low level by the limiting action of the limiter tube.

The above-described arrangement, however, has the disadvantage that it requires at least one additional tube to perform the squelch function. Additional squelch tube circuits are also required in other prior art devices.

The apparatus of the instant invention avoids the circuit complications of prior art biasing control arrangements by utilizing a relay to control the transducer, and whereas the use of relay means to control the transducer is old in the art, the apparatus of the instant invention constitutes a distinct improvement over all prior art devices, in that its circuit arrangement permits a single three-element electron discharge tube to perform the functions of a limiter and squelch tube.

Accordingly, it is a primary object of the present invention to provide a new and improved noise suppression circuit.

Another object is to provide a new and improved circuit arrangement in which a single electron discharge tube is employed as a limiter and squelch tube.

A further object is to provide a new and improved limiter squelch circuit employing a relay.

Other objects and advantages will become apparent after a perusal of the accompanying specification, when taken in connection with the accompanying drawings, in which.

Figure 1:
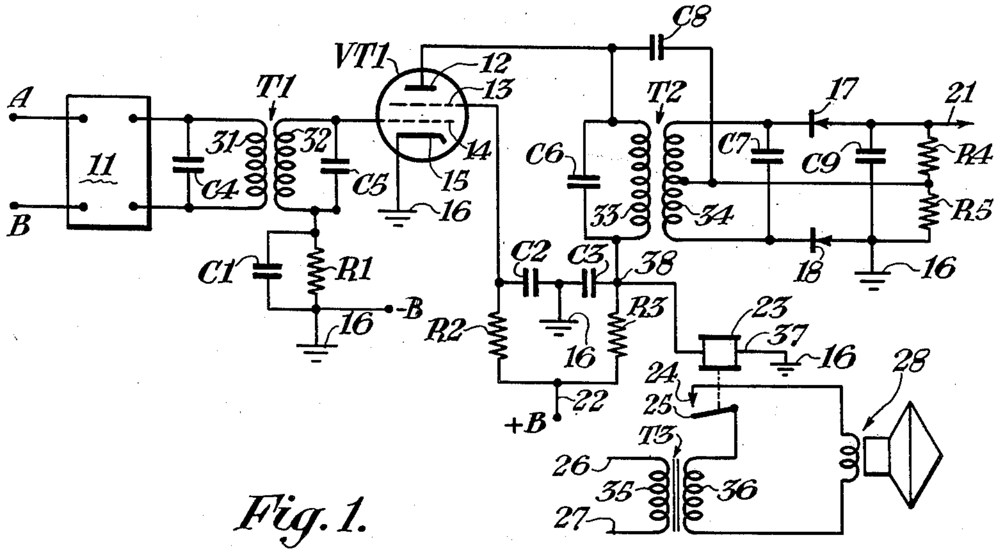
Fig. 1 is a schematic circuit diagram of the preferred embodiment of the invention.

Referring now to the drawings, in which like reference characters are used throughout to designate like parts, for a more detailed description of the invention, and in particular to Fig. 1 thereof, there is shown at 11 an amplifier for the carrier frequency applied across terminals A and B. The amplifier 11 preferably has a gain control, not shown, which may be of conventional design.

The output of amplifier 11 is applied to the primary 31 of a transformer T1, the primary having a capacitor C4 in parallel therewith to provide for tuning the circuit to the carrier frequency. The secondary 32 of the aforementioned transformer T1 has connected in parallel therewith a capacitor C5 for tuning the secondary to resonance at the carrier frequency. One terminal of the secondary 32 is connected to the control grid 14 of a space discharge tube VT1, which may be a tube of the screen grid type having additional elements including anode 12, screen grid 13, and cathode 15, the cathode being connected to ground 16. The other terminal of the secondary 32 is connected, by way of resistor R1, to ground 16, resistor R1 having connected in parallel therewith a by-pass capacitor C1, the resistor R1 providing for biasing the control grid 14 in a manner to be hereinafter more clearly apparent.

The anode 12 is connected to one terminal of the primary 33 of an output transformer T2, the other terminal of primary 33 being connected by way of resistor R3 and lead 22 to the positive terminal of a suitable source of anode potential, not shown, of, for example, 250 volts D. C. Primary 33 has connected in parallel therewith a capacitor C6 for tuning the primary to resonance at the carrier frequency. The aforementioned screen grid 13 is connected by way of resistor R2 and the aforementioned lead 22 to the source of anode potential. A by-pass capacitor C2 is connected from the screen grid 13 to ground 16, and a by-pass capacitor C3 is connected from the junction 38 between primary 33 and resistor R3 to ground 16. The secondary 34 of transformer T2 delivers its voltage to a discriminator or demodulator circuit of conventional design including rectifiers 17 and 18, capacitor C9, and resistors R4 and R5, the output of the discriminator being delivered on a lead 21. Capacitor C7 connected across the secondary 34 is provided for tuning the secondary to resonance, and capacitor C8 is connected, as shown, to provide the necessary out-of-phase component of voltage.

The aforementioned junction point 38 is connected to the winding of a relay 23 of suitable design, which has the other terminal of the winding connected by way of lead 37 to ground 16.

It will be understood that the voltage developed on the aforementioned lead 21 is supplied by way of suitable audio amplifying means, not shown, and leads 26 and 27 to the primary 35 of an audio transformer T3 which has the secondary 36 thereof connected by way of contacts 24 and 25 of the aforementioned relay 23 to a loudspeaker or other transducer, generally designated by the reference character 28.

In the operation of the above described circuit, assume by way of explanation a first condition in which there is no carrier signal applied to the aforementioned terminals A and B. Under such a condition the carrier frequency amplifier 11 amplifies any noise present in the input circuit which will pass through the band pass of the carrier frequency amplifier 11. The sensitivity control, not shown, of the amplifier 11 is set so that the amount of noise present at the non-biased control grid 14 of tube VT1 is insufficient to cause more than a very small amount of direct current grid current to flow through resistor R1. With this minimum of direct current grid current flowing through resistor R1, the bias voltage developed on the control grid 14 of tube VT1 is also at a minimum. With the screen grid voltage dropping resistor R2 fixed so that the screen grid voltage is near the full voltage rating of the tube, and with the grid voltage at a minimum, the plate or anode current of tube VT1 is at a maximum. With the plate current at a maximum, the voltage drop across resistor R3 is also at a maximum. Accordingly, the direct current voltage drop across the winding of relay 23 is at a minimum. The winding of relay 23 is preselected so that, under the aforementioned operating conditions, the voltage is insufficient to energize the relay. The contacts 24 and 25 as shown are open while the relay is deenergized, and therefore in the standby condition, since the relay contacts are open, the loudspeaker circuit is not completed, and there is no audio noise emitted from the loudspeaker 28.

Assume now a second condition of operation in which a carrier frequency signal of the preselected frequency and of at least predetermined amplitude is applied to the receiver input circuit at terminals A and B. Under such a condition the control grid 14 of tube VT1 will draw sufficient direct current to develop a substantial bias voltage on the control grid 14 by the current flowing through resistor R1. The increase of the control grid bias voltage will cause the anode current to decrease, the voltage drop across resistor R3 will decrease, and the voltage across the winding of relay 23 will increase. When the voltage across the relay 23 is of sufficient magnitude to energize the relay, the loudspeaker circuit is completed through contacts 24 and 25, and the loudspeaker 28 is allowed to emit the audio modulation of the carrier.

In addition to controlling the operation of the relay, tube VT1 acts as an amplitude limiter to the signal applied to its grid 14; the combination of a low plate voltage and a bias voltage varying directly as the magnitude of the incoming signal allows tube VT1 to limit the amplitude of the carrier frequency voltage developed across the tuned circuit comprising primary 33 and capacitor C6. The amplitude of the carrier frequency voltage will not increase beyond a certain level determined by the circuit constants and the combination of voltages on the control grid, screen grid, and anode. Accordingly, a fixed level of carrier frequency voltage is applied to the discriminator circuit regardless of variations in the amplitude of the signal applied to the limiter, and increases in this last named signal beyond the amount required to saturate the plate circuit cause no further increase in the voltage applied to the discriminator.

Preferably, but not necessarily, a multi-grid tube is used at VT1. A pentode amplifier tube is suitable for use at this point in the circuit, having sufficient plate and screen grid current carrying capacity to permit the circuit to operate while using a low resistance value of resistor R3, while at the same time getting a large voltage drop across resistor R3. While using a power pentode, in the standby condition, the voltage across the relay may lack only a few volts of being equal to the power supply voltage. Keeping the resistance of resistor R3 as low as possible permits the use of a high resistance relay winding. A time delay in the relay operation may be provided for by the time constant of capacitor C3 and the resistance of the winding itself.

Figure 2:
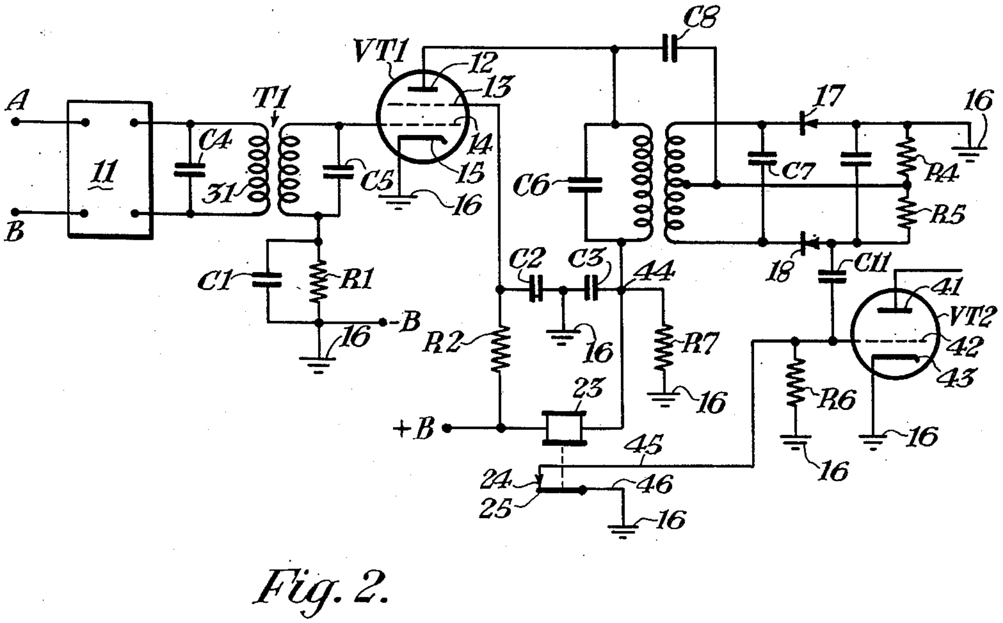
Fig. 2 is a schematic circuit diagram of a modification of the circuit of Fig. 1.

Particular reference is made now to Fig. 2 in which is shown a modification of the circuit of Fig. 1, the contacts of the relay being shown in the position they assume while no carrier is being received. In the circuit of Fig. 2 the winding of relay 23 is connected directly in the anode-cathode circuit and the full anode current flows through this winding. Resistor R7 is connected from junction point 44 to ground to assist in stabilizing the voltage at this point. In this circuit arrangement the relay is energized while the receiver is in the standby condition and the contacts 24 and 25 are then closed. It is to be noted that in this circuit arrangement the closing of the contacts connects to ground, by way of leads 45 and 46, the control grid 42 of an audio amplifier tube VT2, which has the output of the aforementioned discriminator applied thereto by way of capacitor C11, the tube VT2 having an anode 41 and cathode 43 which, it will be understood, are operatively connected to a transducer or utilization circuit, not shown. Grid 42 is connected to ground 16 by way of resistor R6. While a modulated signal is applied to the control grid of tube VT1, the relay is deenergized due to the reduction in anode current, the contacts of the relay open, and the audio amplifier including tube VT2 is allowed to operate in its normal manner.

Figure 3:
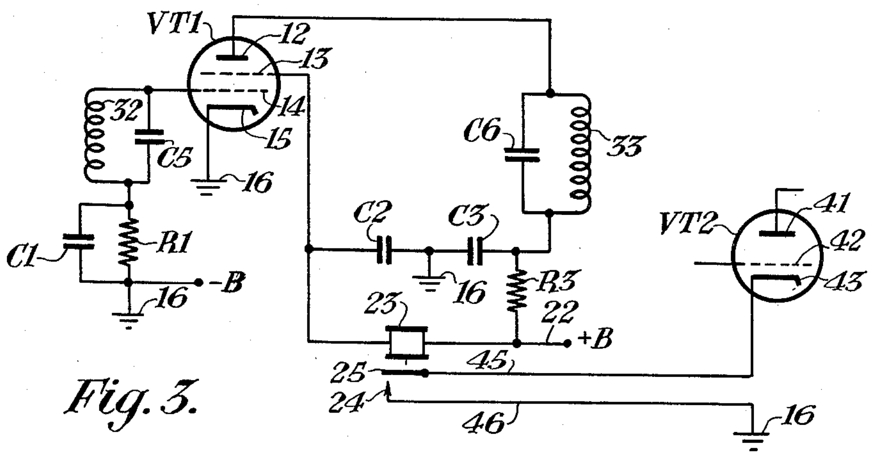
Fig. 3 is a schematic circuit diagram of another modification of the circuit of Fig. 1.

Particular reference is made now to Fig 3 in which is shown an additional modification of the circuit of Fig. 1, the contacts of the relay being shown in standby condition. It will be understood that the portions of the circuit of Fig. 3 not shown are similar to the corresponding portions of the circuit of Fig. 2, except that the control grid 42 of tube VT2 is not arranged to be connected to ground. In the circuit of Fig. 3, the winding of relay 23 is connected in series with the screen grid 13 of tube VT1, and the relay is energized in the receiver standby condition. Its normally closed contacts 24 and 25 complete the cathode to ground circuit of the aforementioned audio amplifier tube VT2, by way of leads 45 and 46. Upon the application of a modulated signal at the control grid 14 of tube VT1, the screen grid current is reduced, thus deenergizing the squelch relay, the contacts of the relay closing and accordingly allowing the audio amplifier tube VT2 to operate in its normal manner. It is to be noted that the contacts 24 and 25 of the relay of Fig. 3 are normally closed while the relay is deenergized.

Figure 4:
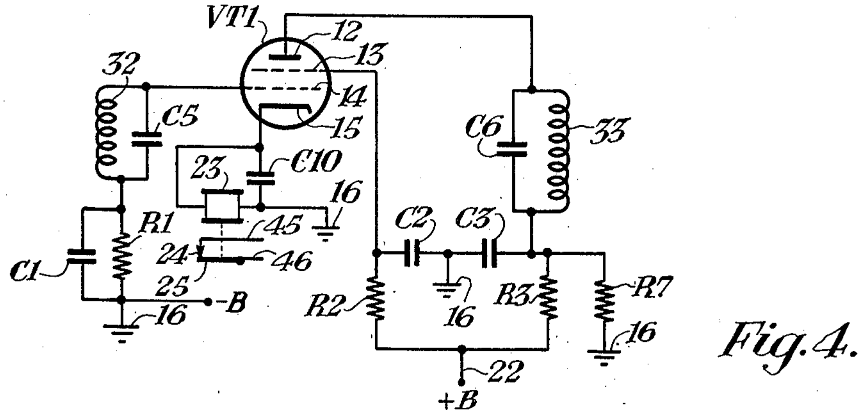
Fig. 4 is a schematic circuit diagram of still an additional modification of the circuit of Fig. 1.

Particular reference is made now to Fig. 4 in which is shown still another modification of the circuit of Fig. 1, it being understood that the portions of the circuit of Fig. 4 which are not shown are similar to the corresponding portions of the circuit of Fig. 2. In the circuit of Fig. 4, the relay 23 has its winding connected between the cathode 15 of tube VT1 and ground 16, and has connected in shunt therewith capacitor C10. The relay is shown in the drawing as it is energized while the receiver is in the standby condition, its contacts grounding the control grid 42 of the aforementioned amplifier tube VT2 by way of leads 45 and 46. Upon the application of a carrier frequency signal of at least a predetermined magnitude at the control grid 14 of tube VT1, the plate and screen currents are reduced and the total current through the relay is reduced, deenergizing the relay. In the deenergized condition the contacts are open, and the audio amplifier tube VT2 is allowed to operate in its normal manner.

Although I have herein shown and described several embodiments of my invention, it is to be understood that various changes and modifications may be made therein within the scope of the appended claims without departing from the spirit and scope of my invention. For example, the circuit of Fig. 1 could, if desired, have an audio amplifier arrangement similar to that of Fig. 2. For further example, the resistor R7 in the embodiments of Figs. 2, and 4 could be eliminated if desired. Also, a second limiter tube could be added if desired.

Having thus described my invention, what I claim is:

1. An electrical signal transmission circuit comprising electron discharge tube means including an electron discharge tube having at least a cathode, control grid, and anode, circuit connections for applying to said control grid an intermittent carrier signal, said carrier signal while applied causing a decrease in the anode current in said tube, demodulator means electrically coupled to said anode and energized therefrom, transducer means, resistor means, circuit means connecting said resistor means to said anode in a manner whereby a voltage drop is developed across said resistor means which is a function of the anode current in said tube, relay means operatively connected to said resistor means and selectively energized and deenergized in accordance with variations in the voltage drop across said resistor means, said relay means including a pair of contacts, said demodulator means having the output thereof operatively connected to said transducer means by way of said pair of contacts to render said transducer means inoperative during intermissions in the application of said carrier signal to said control grid.

2. In a carrier signal receiving circuit which includes a signal responsive device, amplifier means having the carrier signal applied thereto, electron discharge tube means including an electron discharge tube having at least a cathode, control grid, and anode, circuit means connecting the output of said amplifier means to said control grid, first resistor means operatively connected to said control grid and adapted to bias said control grid while current flows between said control grid and cathode, second resistor means operatively connected to said anode and carrying at least a portion of the space discharge current of said tube, and relay means operatively connected to said second resistor means and having the energization thereof controlled by the voltage drop across said second resistor means, said relay means being operatively connected to said signal responsive device for rendering said device inoperative in the absence of a carrier signal of predetermined magnitude.

3. In a signal receiving circuit including a signal responsive device, amplifier means having the signal applied thereto; electron discharge tube means including an electron discharge tube having at least a cathode, control grid, and anode; the grid-cathode circuit of said tube including serially connected resistor means for developing a grid bias while grid current flows in said tube and coupling means operatively connected to said amplifier means for applying the output of said amplifier means to said control grid; a source of anode potential, an anode resistor, and output means all serially connected in the anode-cathode circuit of said tube; a relay having a winding and at least one set of contacts; circuit means operatively connecting said winding between said cathode and the junction between said anode resistor and said output means, the voltage sensitivity of said winding being preselected so that the relay is energized while the anode current in said tube and the voltage drop across said anode resistor have predetermined values; and circuit means including said contacts interconnecting said output means and said signal responsive device whereby said device is rendered inoperative in the absence of a signal of at least a predetermined magnitude applied to said control grid.

References Cited in the file of this patent

UNITED STATES PATENTS

| | | |
|---|---|---|
| 2,167,058 | Dyck et al. | July 25, 1939 |
| 2,239,907 | Loon | Apr. 29, 1941 |
| 2,343,115 | Noble | Feb. 29, 1944 |
| 2,447,564 | Carnahan | Aug. 24, 1948 |
| 2,478,320 | Riordan | Aug. 9, 1949 |
| 2,531,433 | Hoffman et al. | Nov. 28, 1950 |
| 2,533,543 | Young | Dec. 12, 1950 |
| 2,560,312 | Tellier | July 10, 1951 |
| 2,589,711 | Lacy | Mar. 18, 1952 |
| 2,647,993 | Ziffer | Aug. 4, 1953 |

FOREIGN PATENTS

| | | |
|---|---|---|
| 363,433 | Italy | Oct. 5, 1938 |
| 134,781 | Australia | Oct. 30, 1949 |